May 24, 1955     G. V. CONSTANTAKIS ET AL     2,708,957
ANTI-SKID TIRE TREAD

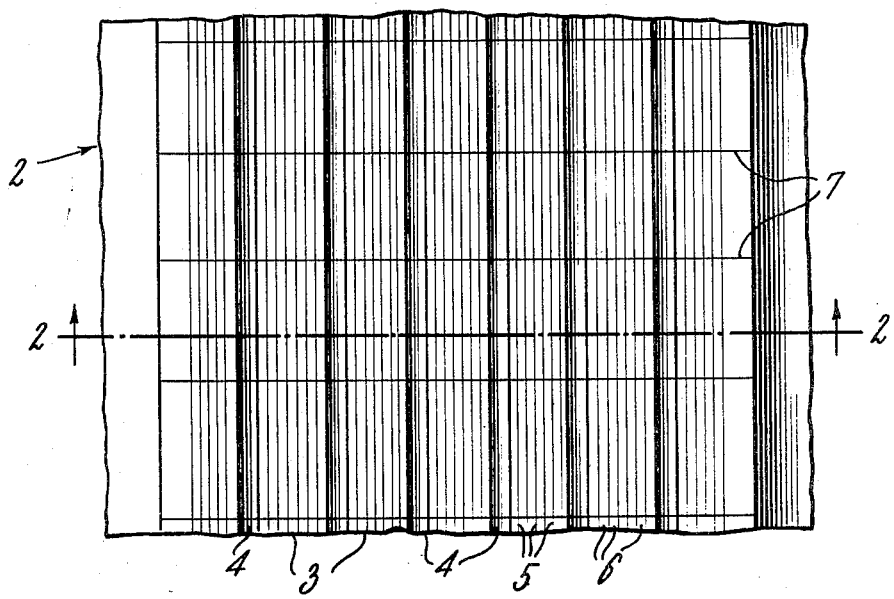
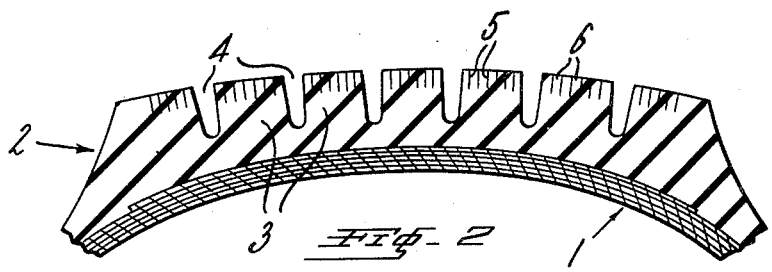
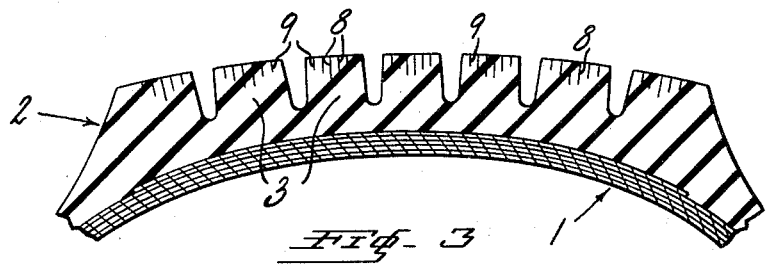

Filed Jan. 4, 1950     2 Sheets-Sheet 2

INVENTORS
GEORGE V. CONSTANTAKIS
JOSEPH W. KARSAI
BY
Charles C. Willson
ATTORNEY

United States Patent Office 2,708,957
Patented May 24, 1955

2,708,957

ANTI-SKID TIRE TREAD

George V. Constantakis, Allen Park, and Joseph W. Karsai, Detroit, Mich., assignors to United States Rubber Company, New York, N. Y., a corporation of New Jersey Application January 4, 1950, Serial No. 136,686

7 Claims. (Cl. 152—209)

This invention relates to pneumatic or other rubber tires having good anti-skid properties, and more particularly it relates to pneumatic tires having the road engaging surface thereof slitted in a manner to cause the tire to effectively grip the road to prevent skidding.

In the manufacture of pneumatic tires, the road engaging portion of the tread is designed with particular reference to its use over average road surfaces. It is generally recognized that tread patterns consisting of ribs, blocks, knobs or the like are not very effective regarding traction and skid resistance when the road surface is coated with ice or packed with snow.

We have found that if a tire tread is cut lengthwise of the tread with a number of slightly spaced and shallow cuts, as hereinafter described, a substantial improvement is obtained in its co-efficient of friction with the road and the grip of the tire upon the road surface. This cutting is preferably effected by forming with sharp thin blades a multiplicity of slits lengthwise of the tread over its road engaging surface to form thin ribs between the slits.

It is old to provide a tire tread with molded narrow ribs extending lengthwise of the tread, and it is also old to roughen or score the surface of a tire tread by cutting grooves therein to increase its grip upon the road surface. The present invention contemplates a different treatment from that used heretofore, in that in accordance with the present invention the slits are made without removing any rubber from the tire and without changing the appearance of the tread surface appreciably; that is these slits are preferably so formed that they cannot be seen by the unaided eye at a distance of more than three or four feet from such tread. These slits are preferably spaced only a few hundredths of an inch apart to form thin narrow ribs or laminations that abut one against the other and have a height that is approximately twice the rib width. Such slits serve to increase the softness and flexibility of the tread surface in the vicinity of such surface but not to any substantial depth in the tire tread, and it is found in practice that this treatment greatly reduces the skidding tendency of such tire both longitudinally and transversely under operating conditions.

It is to be understood that the present slitted tread, while capable of operating under all standard road conditions, is intended primarily for use when the road surface is covered with ice or snow. Under these conditions the tread is capable of operating for several thousand miles before losing much of its effectiveness due to tread wear. This period of effectiveness is usually sufficient to provide an anti-skid tread surface throughout the winter months of the year. If desired, a tire may be treated repeatedly during a single winter season for providing the anti-skid surface, or it may be treated at the beginning of each winter for several years.

The anti-skid properties of the tire of the present invention can be further improved by also cutting the tire tread transversely with slits spaced about an inch apart to thereby make the thin longitudinally extending ribs non-continuous so that the ends of these ribs will engage the road surface.

Among the objects of the present invention, are to provide a pneumatic tire having a high co-efficient of friction between its tread surface and a road surface, particularly when the road surface is coated with ice or snow, and to provide such tire tread surface that can be effected efficiently and economically.

The above and other features of the present invention will be further understood from the following description when read in connection with the accompanying drawings, wherein:

Fig. 1 is a plan view of portion of a pneumatic tire illustrating a tread that has been treated in accordance with the present invention to impart the anti-skid construction thereto.

Fig. 2 is a sectional view taken on the line 2—2 of Fig. 1.

Fig. 3 is a view similar to Fig. 2 but shows a modification of the cuts;

Figure 4:
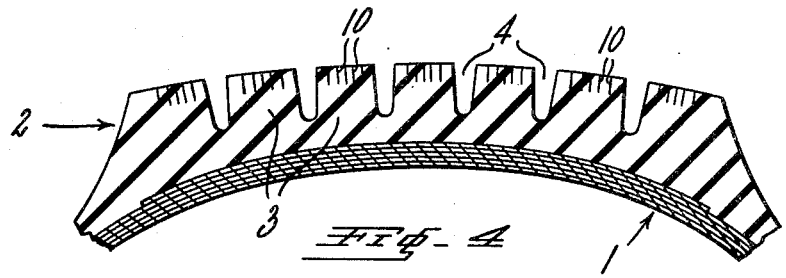
Fig. 4 is a view similar to Fig. 2 but shows another modification of the cuts.

Referring to the drawing and more particularly to Figs. 1 and 2, these views show part of a pneumatic tire comprising the usual carcass 1 formed of a number of plies of cord fabric, and have secured thereto a tread portion 2 formed of rubber or rubber-like material. The road engaging portion of the tread 2 is commonly provided with ribs, blocks or knobs designed to give added traction, and which are herein shown as longitudinally extending road engaging elements 3. These elements which are given the desired shape during the tire molding and vulcanizing operation are shown as having formed therebetween the relatively deep grooves 4 of substantial width. The tire construction so far described with reference numerals is of usual construction and is only one of many forms of tire tread which may be treated in accordance with the invention to give the tire better traction upon ice and snow.

In accordance with the present invention most of the elements 3 are provided with rather shallow and closely positioned slits formed longitudinally of the tire tread. As shown in Figs. 1 and 2 each of the elements 3, except the two outermost elements, is provided with six of these relatively shallow slits indicated by the numeral 5. As shown, these slits 5 have a depth substantially less than the depth of the grooves 4. The two outermost elements 3 are shown as provided with fewer slits. The purpose in so slitting the surface of the tire tread is to form the ribs or laminations 6 which abut one another. The width of these ribs or laminations and their height are important, since they should be so formed that they will increase slightly the softness and flexibility of the tire surface in the vicinity of such surface but not to any substantial depth into the rubber forming the tire tread, because if these slits are made relatively deep they will unduly weaken the tread surface and impair the wear-resisting properties of the tire. The width of each rib or lamination 6 is preferably about .06" but may vary from .05" to .15". The height of these ribs or laminations is preferably about .16" but may vary from about .10" to .20".

It has been found as a result of road tests that automobile tires having the tread surface thereof provided with slits such as herein disclosed are far more effective in resisting skidding both longitudinally and transversely than are the same tires when not provided with such slits. It is also found that the skid resisting properties of the tire may be further increased by providing such tire with the transversely extending slits 7 which are spaced much further apart than are the longitudinally extending slits 5. The distance between the slits 7 is preferably varied somewhat as shown in Fig. 1 of the drawing, because it is found that if these slits are uniformally spaced the tire may tend to produce a humming sound as it rolls over the road, but will not produce such sound if the distance between these slits is varied from one slit to another. These transverse slits 7 divide the surface portions of the ribs 6 into normally abutting, separately functioning blocks or segments which present additional edges that further resist skidding.

It is not essential that the slits 5 be of uniform depth, since the depth of such slits may be varied. One example of such variation in the depth of these slits is shown in the modified construction of Fig. 3, wherein it will be seen that the slits 8 spaced inwardly a substantial distance from the sidewalls of a longitudinally extending element 3 are much deeper than the slits 9 lying close to the sides of such element. The deepest slits 8 may have a depth of about .20" whereas the most shallow slits 9 preferably are only about half this deep. These slits are preferably spaced the same distance apart as in the construction of Figs. 1 and 2, and the effect of varying the depth of the slits as shown in Fig. 3 is to cause the ribs near the center of a longitudinally element 3 to be slightly softer and more flexible than the ribs adjacent each side of such longitudinally extending element.

Instead of varying the depth of the slits as shown in Fig. 3, the distance between such slits may be varied as indicated by 10 in Fig. 4, where it will be seen that the slits near each side of a longitudinally extending element 3 are spaced further apart than the slits 10 lying at the center of the face of such element.

Figure 5:
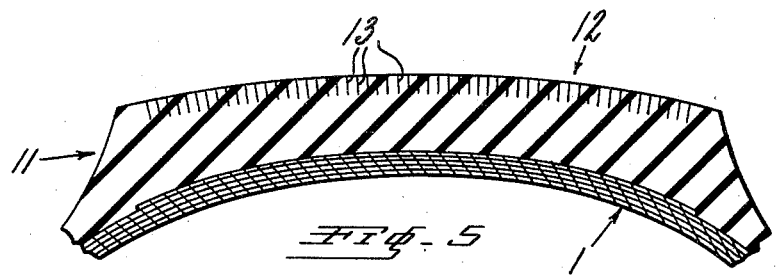
Fig. 5 is a transverse sectional view of a smooth face pneumatic tire having its tread surface slitted in accordance with the present invention.

Fig. 5 is a transverse sectional view of a pneumatic tire having the carcass 11 and the plain face 12 which is cut with the longitudinally extending slits 13.

The above described longitudinally extending slits may be formed by placing a new tire or partly worn tire upon a rotating tire support, such as shown in the Wikle Patent 2,269,137, and by mounting the thin slit forming knives in a head. This head may then be advanced to insert the knives progressively in the tread surface to the desired depth while the tire is rotated at approximately 200 revolutions per minute, whereupon the knives are withdrawn.

Figure 6:
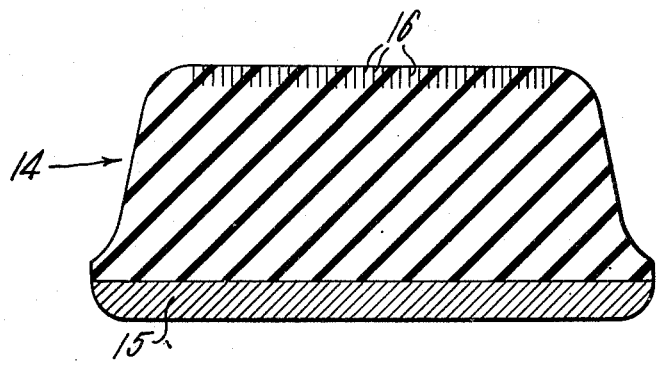
Fig. 6 is a vertical sectional view through a solid rubber tire having the tread surface thereof treated in accordance with the present invention.

While the construction of the present invention was developed primarily for use on pneumatic tires, it is found that it also may be employed to advantage on solid rubber tires such for example as shown in Fig. 6 of the drawing, which view is a section through a solid rubber tire 14 and wheel rim 15 of the type commonly used in factories on hand or power operated trucks. These factory trucks frequently operate on wet wood or concrete floors, and it is found that if such solid rubber tire has the tread surface thereof provided with the longitudinally extending slits 16, that are preferably spaced about the same distance apart as the slits above described and are given about the same depth as the slits 5, they will materially reduce the tendency of the solid rubber tire to slip either longitudinally or transversely. It is found that on smooth surfaces there is a definite improvement in rolling resistance of tires treated in accordance with our invention. It is also found that if the floor of the factory or other place, where a truck having solid rubber tires is used is rough, the truck provided with such slitted tires will be slightly easier to roll because the slits 16 by increasing the flexibility of the tire surface will permit slight projections on the floor to project into the tire surface, instead of forcing the tire to rise to pass over such projections.

Pneumatic tires having the surface slitted as herein contemplated have been subjected to road tests on ice and packed snow, and also have been subjected to drawbar tests with the results set forth in the following examples.

*Example 1*

A pair of 7.00–16 tires, having a smooth tread surface slitted in accordance with the present invention and when mounted on the driving wheels of a vehicle, showed a drawbar pull of 1370 pounds as against 760 pounds for similar tires not so slitted. This represents an 80% improvement. This was a traction test on snow covered grades.

The same tires showed an improvement in coefficient of friction of 65% on smooth, wet concrete, 36% on glare ice and 123% on packed snow.

*Example 2*

A pair of 7.60–15 tires, having seven circumferentially extending tread elements and slitted in accordance with the present invention, and when mounted on the driving wheels of a vehicle showed a drawbar pull improvement of 53% on snow covered grades when compared with similar tires not so slitted. It also showed a 47% improvement in coefficient of friction in loose snow tests.

*Example 3*

A single pneumatic tire such as shown in Figs. 1 and 2 of the drawing, except that it was free from the longitudinal slits 5 and transverse slits 7, was placed on a rear wheel of an automobile. Then this wheel was caused to rest on a surface of smooth ice, while the other rear wheel rested on a dry surface relatively to which it did not turn. The wheel resting on the ice was then driven by the automobile engine and differential so that it rotated at 20 miles per hour as it slipped upon the icy surface. This smooth or unslitted tire exerted a drawbar pull upon the automobile of 25 lbs. The same tire when provided with the transverse cuts 7 but not the longitudinal cuts 5 was similarly tested and exerted a drawbar pull of 70 lbs. When the same type of tire was provided with the longitudinal cuts 5 but not the transverse cuts 7 it exerted a pull of 105 lbs. and when the same type of tires was provided with the longitudinal cuts 5 and transverse cuts 7 as shown in Fig. 1 it exerted a drawbar pull of 200 lbs. as it slipped on the icy surface.

In order to secure the remarkable performance of Examples 1, 2 and 3 it is believed necessary to slit the tread surface of the tire to the approximate dimensions above described, and so that the ribs 6 or other ribs will be sufficiently thin and flexible to conform accurately to the contour of the road surface.

Tires treated in accordance with this invention have surprisingly good anti-skid properties particularly on ice and snow, thus resulting in an additional margin of safety to vehicles and its occupants in overcoming the hazards of driving in adverse weather conditions.

Having thus described our invention what we claim and desire to protect by Letters Patent is:

1. A pneumatic tire having an anti-skid tread of rubber or the like provided with a number of anti-skid road-engaging elements extending lengthwise of the tire and separated transversely by grooves of substantial depth, some of said elements having the road-engaging face thereof slitted lengthwise of the tire to form thin ribs abutting one another and having an average height of from .10" to .20" and a width that is less than the height, to thereby render the face of said elements more flexible so that the tread will conform readily to the contour of the road and grip the road surface securely.

2. A pneumatic tire having an anti-skid tread of rubber or the like provided with a number of anti-skid road-engaging elements extending lengthwise of the tire and separated transversely by grooves of substantial depth, some of said elements having the road-engaging face thereof slitted lengthwise of the tire to form thin ribs abutting one another and having a width of from .05" to .15" and a height of from .10" to .20", to render the face of said elements flexible enough to grip the road surface securely.

3. An anti-skid tire tread of rubber or the like provided with a road engaging surface and having extending lengthwise thereof a multiplicity of slits that cut said surface into narrow ribs abutting one another and having a width of from .05" to .15" and a height of about twice the width, to render said surface flexible enough to conform readily to the contour of the road and grip the road surface securely.

4. A pneumatic tire having an anti-skid tread of rubber or the like provided with a number of anti-skid road engaging elements extending lengthwise of the tire and separated one from another transversely by grooves of substantial depth, some of said elements having the road-engaging face thereof slitted lengthwise with both deep and shallow slits to form ribs not more than .15" thick and of varying height in the same element, and thereby render the face of said elements flexible enough to conform accurately to the contour of the road and grip the road surface securely.

5. A tire having an anti-skid tread of rubber or the like comprising a plurality of generally circumferentially extending ribs defining grooves therebetween, some of said ribs having their road-engaging surface portions cut circumferentially of the tire to provide relatively shallow, closely spaced slits forming a plurality of normally abutting thin laminations, and circumferentially spaced slits extending transversely of some of said ribs dividing the surface portions thereof into normally abutting segments or blocks, said laminations being of a height and width adapted to render the road-engaging surface portions of said segments relatively soft and flexible without impairing the lateral stability of said segments, whereby the tread will substantially conform to the contour of a road and grip the surface thereof to resist both longitudinal and lateral skidding.

6. A tire having a tread of rubber or the like provided with a plurality of generally circumferentially extending, laterally stable, anti-skid road-engaging elements separated by grooves, some of said elements having their road-engaging surface portions provided with circumferentially extending, relatively shallow, closely spaced slits forming a plurality of normally abutting thin laminations, and circumferentially spaced slits extending transversely of some of said elements dividing the surface portions thereof into normally abutting segments or blocks, said laminations being of a height and width adapted to impart relative softness and flexibility to said elements in the vicinity of said surface portions in a direction normal to the road surface, without impairing the lateral stability of said elements, so that the tread will substantially conform to the contour of a road and grip the surface thereof and resist both longitudinal and lateral skidding.

7. A pneumatic tire having an anti-skid tread of rubber or the like, comprising generally circumferentially extending ribs having grooves of substantial depth therebetween, said ribs having the road-engaging face thereof slitted transversely across the tire at short intervals to form cuts of substantially less depth than the depth of said grooves and providing transverse road-gripping edges, and a number of said ribs each being provided with slits formed circumferentially of the tire to provide cuts deep enough to sever said gripping edges into much shorter gripping lengths, whereby the tread will substantially conform to the contour of a road surface to resist both longitudinal and lateral skidding.

References Cited in the file of this patent
UNITED STATES PATENTS

| | | |
|---|---|---|
| 2,094,636 | Bull | Oct. 5, 1937 |
| 2,130,594 | Morradian | Sept. 20, 1938 |
| 2,197,662 | Hughes | Apr. 16, 1940 |
| 2,294,626 | Overman | Sept. 1, 1942 |
| 2,302,027 | Havens | Nov. 17, 1942 |
| 2,504,090 | Sanderson | Apr. 11, 1950 |